United States Patent [19]

McDaniel

[11] Patent Number: 5,301,097
[45] Date of Patent: Apr. 5, 1994

[54] MULTI-STAGED CHARGE-PUMP WITH STAGGERED CLOCK PHASES FOR PROVIDING HIGH CURRENT CAPABILITY

[75] Inventor: Bart R. McDaniel, Phoenix, Ariz.
[73] Assignee: Intel Corporation, Santa Clara, Calif.
[21] Appl. No.: 896,195
[22] Filed: Jun. 10, 1992
[51] Int. Cl.⁵ .............................................. H02M 7/25
[52] U.S. Cl. ..................................... 363/60; 307/110
[58] Field of Search ..................... 363/59, 60; 365/226; 320/1; 307/110, 296.2

[56] References Cited

U.S. PATENT DOCUMENTS

| | | | |
|---|---|---|---|
| 4,839,787 | 6/1989 | Kojima et al. | 363/60 |
| 4,933,827 | 6/1990 | Olivo et al. | 363/60 |
| 4,962,512 | 10/1990 | Kiuchi | 377/78 |
| 5,059,815 | 10/1991 | Bill et al. | 307/246 |
| 5,168,174 | 12/1992 | Naso et al. | 307/296.6 |
| 5,208,474 | 5/1993 | Yamagata et al. | 257/356 |
| 5,216,588 | 6/1993 | Bajwa et al. | 363/60 |

Primary Examiner—Steven L. Stephan
Assistant Examiner—Adolf D. Berhane
Attorney, Agent, or Firm—Blakely, Sokoloff, Taylor & Zafman

[57] ABSTRACT

A multiple staged charge pump network with staggered clock phases for pumping a first voltage to a second voltage with high current capability. The charge pump includes multiple serial charge pumps connected in parallel, multi-phase clocks, input voltage and output voltage connectors. The multiple serial charge pumps have in each series a plurality of diode-connected n-channel MOSFETs. The first n-channel MOSFET in each series is coupled to the input voltage connector, while the rest of the n-channel MOSFETs are coupled to a pumping capacitor at their diode-connected gates. The clocks are coupled to the multiple serial charge pumps for generating a plurality of phases of clocks with each phase of the clocks being applied to the alternating n-channel MOSFETs in a series such that adjoining n-channel MOSFETs are not driven by the same phase of clock. The input voltage connector is coupled to the first n-channel MOSFET in each series of the multiple serial charge pump for providing an input voltage. The output voltage connector is coupled to the last n-channel MOSFET in each series of the multiple serial charge pump for generating an output voltage after the input voltage is switched-regulated through the multiple serial charge pump.

13 Claims, 10 Drawing Sheets

(CLKEN = 0V for Vout1;
CLKEN >$V_{DD}$ for Vout2,
typically 12v)

MULTI-STAGED CHARGE-PUMP WITH STAGGERED CLOCK PHASES FOR PROVIDING HIGH CURRENT CAPABILITY

BACKGROUND OF THE INVENTION

1. Field of the Invention

The present invention relates to the field of voltage charge pumps of integrated circuits and specifically to those used to generate reprogramming voltages for memory devices.

2. Art Background

In the field of memory devices such as erasable flash EPROMs and EEPROMs, it is essential to use a 12 V supply (Vpp) when reprogramming the memory devices. Once the command to erase, program, or verify is issued, the device internally generates the required voltages from the Vpp supply. The command register controls selection of internal reference circuitry tapped off of Vpp. An improper Vpp level causes the references to be wrong, degrading the performance of the device.

Typically, higher reprogramming voltages can be generated by pumping from a lower voltage using a charge pump, DC/DC converter, etc. Currently charge pumps are used in applications that require generation of a voltage above the power supply rail with a small current demand, e.g. EEPROMs. For flash EPROMs, however, a potential less than that required for EEPROMs but with current requirements approximately 100 to 1,000 times of EEPROMs are required (in the neighborhood of 1 to 20 mA).

Also, since this new class of charge pumps will necessarily have to be very much larger in area (i.e., much larger pump capacitors) than their EEPROM predecessors, the question of process reliability and raw wafer yield will become a factor in the manufacture of microchip with these sizes of charge pumps.

FIG. 1 illustrates a prior art single series charge pump 10. The single series charge pump 10 uses a two phase clock, CLK 100 and CLK-bar 101, applied to non-adjoining transistor-capacitor nodes. As charges are pumped from Vdd to node Vout through the pumping capacitors 121, 131, 141, 151 and the diode-connected transistors 1 1 0, 120, 130, 140, and 150, an output voltage greater than Vdd can be generated.

The prior art single series charge pump 10 still has its drawbacks. First, because the charge pump for flash EPROMs requires a much greater switching current than EEPROM, noise can be introduced into the power supplies on the chip. Such noise is intolerable and can be detrimental to the system, and additional noise suppression techniques must be implemented. Also, the charge pump produces greater output ripples at the switching frequency because all the charges are transferred to the output load at the same time. Furthermore, a single series charge pump cannot be fault-tolerant, if one capacitor shorts out, causing the charge pump to malfunction.

As will be described, the present invention will demonstrate several unique features implemented specifically for a charge pump to be tolerant to process and wear-induced defects in the charge pump capacitors, which are about 95% of the active area of the charge pump.

These unique features will also enable a charge pump to operate at a high percentage of its output current capability, e.g. more than 90% of normal capacity achievable given enough parallel charge pump segments.

These unique features will further ensure that capacitor defects will not induce bipolar-type latch-up currents in the CMOS process due to a specially designed all-NMOS clock driver output buffer with particular application for N-well CMOS process.

SUMMARY AND OBJECTS OF THE INVENTION

Therefore, it is one object of the present invention to provide a charge pump large enough to handle large EPROM operations and FLASH EPROM.

It is another object to provide a charge pump with distributed, reduced noise amplitude introduced to the power supplies of an integrated circuit.

It is another object to provide a charge pump with reduced output ripples and continuous current supply at the output.

It is yet another object to provide a charge pump with high current capability.

It is yet another object to provide a charge pump with fault tolerance of capacitor shorts.

A multiple parallel staged charge pump network for pumping a first voltage to a second voltage with high current capability is disclosed. The charge pump includes multiple serial charge pumps connected in parallel, multi-phase clocks, input voltage and output voltage connectors. The multiple serial charge pumps have in each series a plurality of diode-connected native threshold MOSFETs. The first native threshold MOSFET in each series is coupled to the input voltage connector, while the rest of the native threshold MOSFETs are coupled to a pumping capacitor at their diode-connected gates. The clocks are coupled to the multiple serial charge pumps for generating a plurality of phases of clocks with each phase of the clocks being applied to the alternating native threshold MOSFETs in a series such that adjoining native threshold MOSFETs are not driven by the same phase of clock. The input voltage connector is coupled to the first native threshold MOSFET in each series of the multiple serial charge pump for providing an input voltage. The output voltage connector is coupled to the last native threshold MOSFET in each series of the multiple serial charge pump for generating an output voltage after the input voltage is switched-regulated through the multiple serial charge pump.

Other objects, features, and advantages of the present invention will be apparent from the accompanying drawings and from the detailed description that follows below.

BRIEF DESCRIPTION OF THE DRAWINGS

The present invention is illustrated by way of example and is not limited to the figures of the accompanying drawings, in which like references indicate similar elements and in which.

DETAILED DESCRIPTION

Typically, charge pumps exhibit to a first order a characteristic called a loadline. A linear loadline of the charge pump can be characterized by its open-circuit voltage (x-intercept) and its conductance (slope) as shown in FIG. 2(a).

Figure 1:
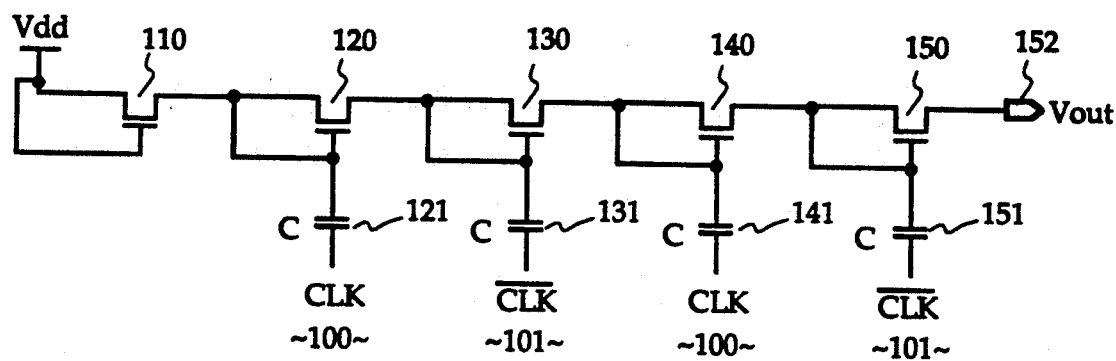
FIG. 1 illustrates a prior art single series charge pump.
Figure 2:
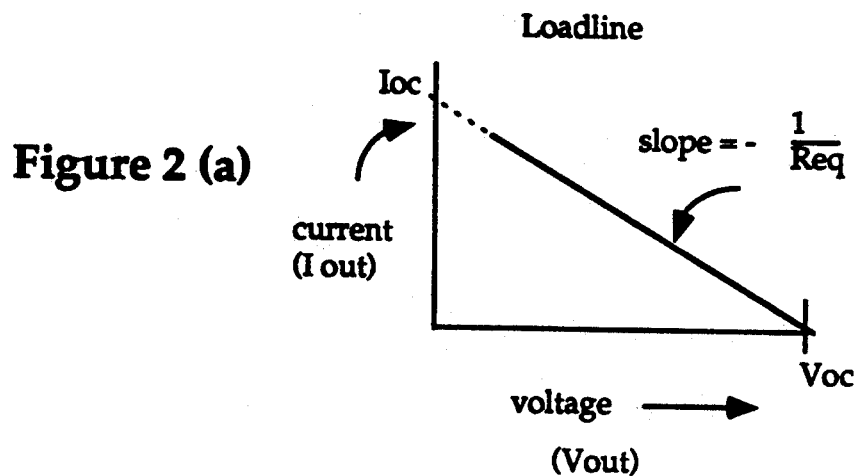
FIG. 2(a) illustrates a linear loadline for charge pumps.
FIG. 2(b) illustrates a Thevinen's equivalent circuit of an ideal charge pump.
Figure 2:
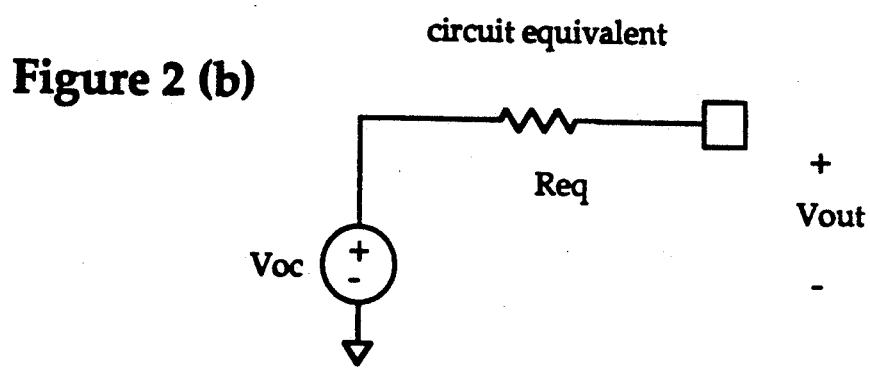

Ideally a charge pump behaves like a Thevinen's voltage source, that being a DC voltage source with a series resistance as shown in FIG. 2(b).

Figure 3:
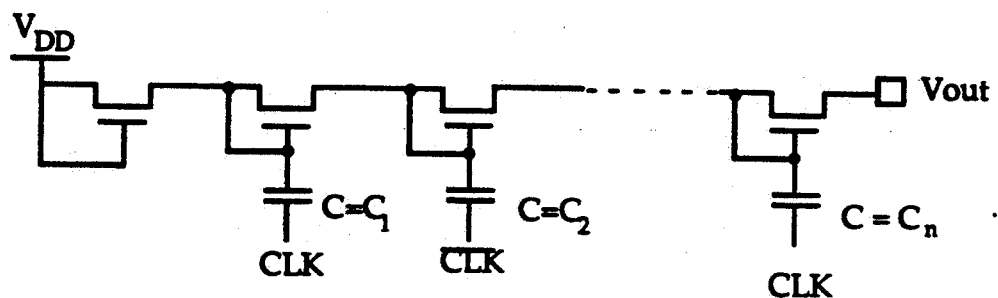
FIG. 3 illustrates a charge pump of MOS configuration.

In simplified terms for a charge pump of MOS configuration, as shown in FIG. 3, $V_{oc} \approx (n+1)(V_{DD} - V_T)$, where "n" is the number of pumped diodes, and $$R_{eq} \approx \sum_{1}^{n} \frac{1}{fC_{eq}} \text{ where the diode } R_{SAT} << \frac{1}{fC_{eq}} \text{ and }$$

$$C_{eq} \approx C_n \left( \frac{1}{1 + \frac{C_{parasitic}}{C_n}} \right)$$

for any stage n and f is the clock frequency.

Figure 4:
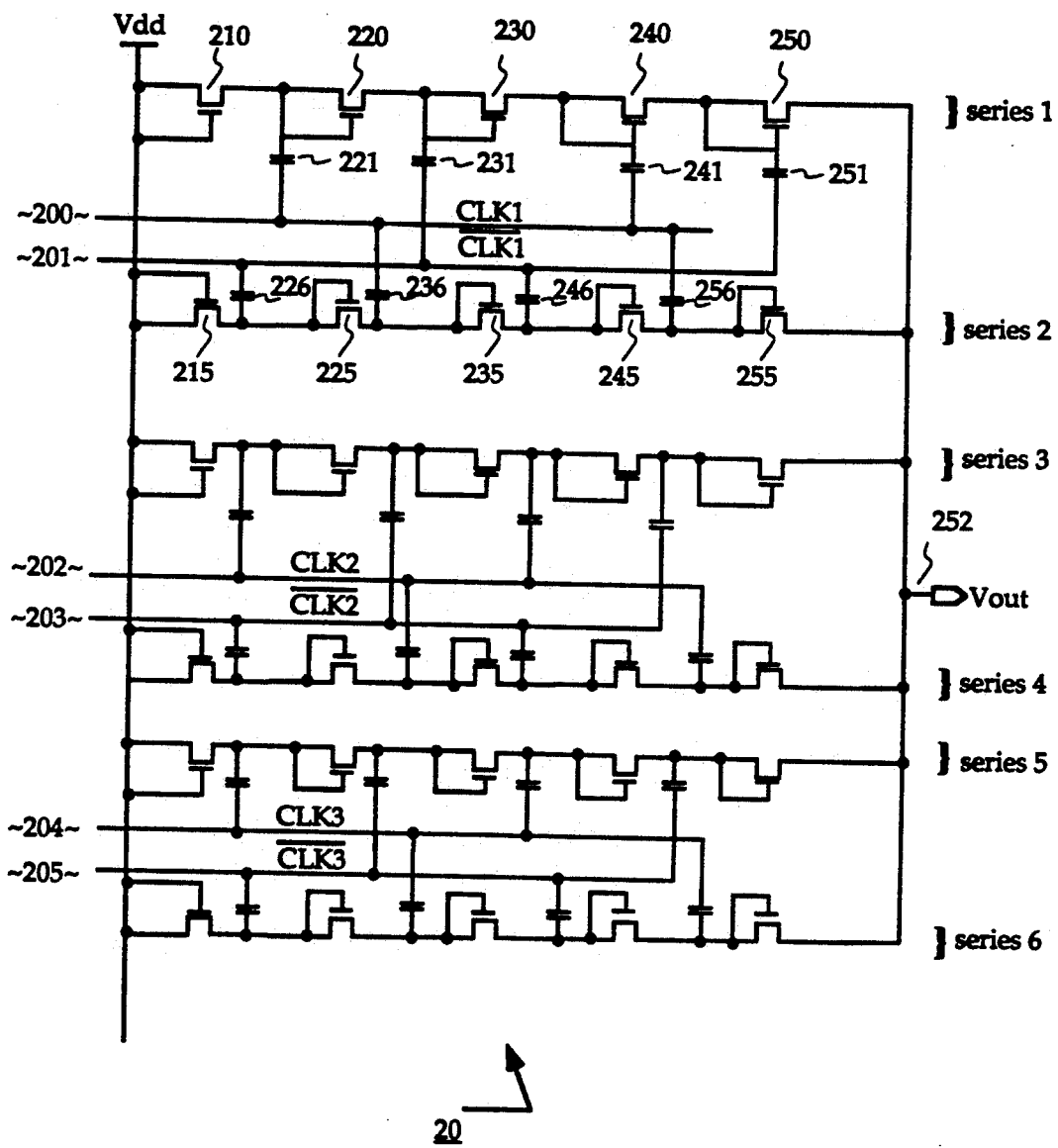
FIG. 4 illustrates a unique multiple series charge pump within a multi-staged charge pump network of one preferred embodiment.

FIG. 4 illustrates a unique multiple series charge pump 20 within a multi-staged charge pump network of one preferred embodiment. Charge pump 20 is shown comprising six serial charge pumps connected in-parallel. Series 1 is formed by diode-connected n-channel MOSFETs 210, 220, 230, 240, 250 and pumping capacitors 221, 231, 241, 251, wherein capacitors 221, 241 are connected to CLK1 200 and capacitors 231, 151 to CLK1-bar 201. In a similar manner, series 2 is formed by diode-connected n-channel MOSFETs 215, 225, 235, 245, 255 and pumping capacitors 226, 236, 246, 256, wherein capacitors 226, 246 are connected to CLK1-bar 201 and capacitors 236, 256 to CLK1 200. Series 3, 4, 5 and 6 are formed similarly with the exceptions that series 3 and 4 have their pumping capacitors alternately connected to CLK2 202 and CLK2-bar 203, while series 5 and 6 are clocked by CLK3 204 and CLK3-bar 205. As shown, the first diode-connected MOSFETs in series 1-6 are connected to the power supply Vdd as their input voltage to be pumped. The other ends of series 1-6 are connected to the node Vout 252 as their output voltage.

The operation of multiple series charge pump 20 is now described with reference to FIG. 4. The multiple series charge pump 20 regulates input voltage Vdd to a higher voltage Vout at node 252 by pumping charges through capacitors in the series 1-6. As illustrated in FIG. 4, the pumping capacitors in each series are alternately turned on by CLK's and CLK's-bar, i.e. series 1 and 2 by CLK1 200 and CLK1-bar 201, series 3 and 4 by CLK2 202 and CLK2-bar 203, and series 5 and 6 by CLK3 204 and CLK3-bar 205. With the alternating clocks applied to adjacent pumping capacitors, no adjoining pumping capacitors in each series are activated during the same clock cycle and the accumulated charges thus can be transferred through the diode-connected MOSFETs. For example, in series 1, a low in CLK1 200 causes capacitor 221 to charge from Vdd. The charges, however, will be stored in capacitor 221 until CLK1 200 goes high, i.e. CLK1-bar 201 goes low. When CLK1-bar 201 goes low, the charges in capacitor 221, which becomes connected in-series to the supply Vdd, are pumped to capacitor 231, which stores the combined charges there until the next clock cycle. Similarly, capacitor 226 is charged up by the supply Vdd when CLK1-bar 201 is low. The charges, which includes the now serially connected supply Vdd, are pumped to capacitor 236 when CLK1 200 turns low for capacitor 236, which isolates the charges there because its adjoining capacitors are shut off by the high CLK1 200.

Through CLK2 202, CLK2-bar 203, CLK3 204, and CLJK3-bar 205, charges are pumped through series 3-6 in a similarly alternating manner. Also, because CLK1 200, CLK2 202 and CLK3 204, as well as the complementary CLK-bar signals, have different phase shifts from each other, the charges are pumped to node 252 at different times. Thus, more charges can be pumped to node 252 through the multiple series pump 20, while the magnitude of switching noise introduced into the power supply is reduced by distributing over the different series by different clocks. It should be understood that the switching current for a serial charge pump is dominated by the output stage of the clock driver used to drive the pumping capacitors. Such switching current is comprised of current charging the capacitors and "spike" or "crowbar" current in the switching of the clock output stage. Although charge pump 20 is shown comprising six serial pumps, it would be appreciated by those skilled in the art that any number of serial pumps can readily adapt the teachings of the present invention to achieve the same functionality.

As shown in FIG. 4, the multiple series charge pump 20 scales down the current loads and clock driver device width by a factor of "n", where "n" is the number of oscillator waves applied into the system. Thus for "n"=3 as in FIG. 4, current spikes in switching should be ⅓ that of a single serial charge pump. The output ripple is also reduced to 1/6 of the single serial charge pump. The reduction can be expressed as follows:

$$V_{ripple} \leq (V_{dd} - V_t)\left(\frac{C_{pump}}{C_{pump} + C_{load}}\right), \quad \text{(Equation 1)}$$

where Cpump is the capacitance of the last pumped stage

As shown in Equation 1, the amplitudes of current spikes on power supplies are reduced by "n" and there are "n" times the current spikes per oscillator period. The output voltage ripple Vripple is thus reduced by "2n" and there are "2n" times the pulses per oscillator period.

Figure 5:
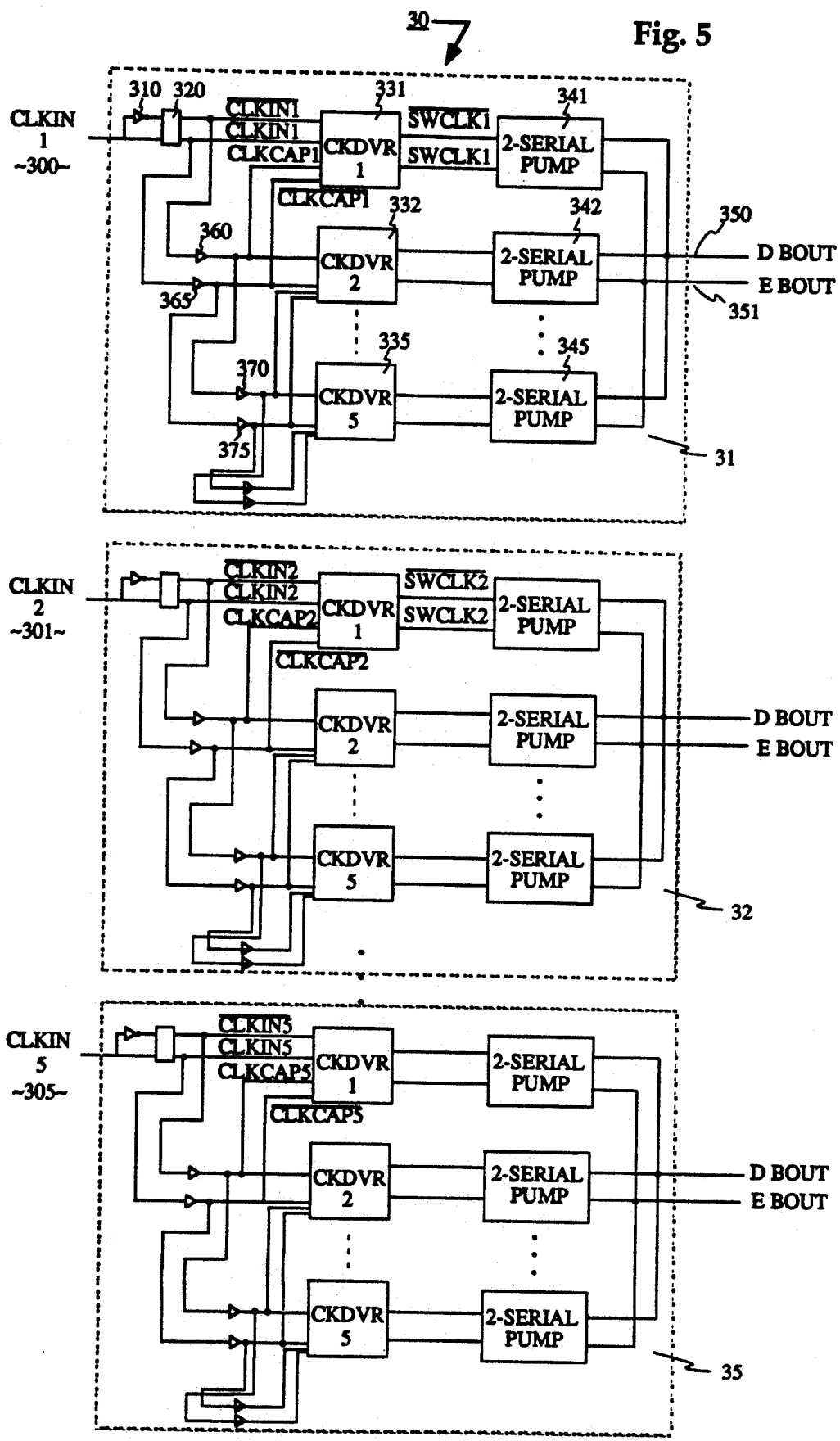
FIG. 5 is a block diagram of the multiple staged charge pump network of another preferred embodiment.

With reference now made to FIG. 5, a block diagram of the multiple staged charge pump network 30 of another preferred embodiment is illustrated. As shown, a clock signal CLKIN1 300 is applied to clock driver 331 through non-overlapping circuit 320, and inverter 310 to provide a non-overlapping complementary signal of CLKIN1 300. The complementary outputs from clock driver 331 are applied to a charge pump pair, which is structurally similar to the six-series charge pump 20 described with reference to FIG. 4. The non-overlapping signals CLKIN1 300 and CLKIN1-bar are applied to delays 360, 365, which provide the inputs to clock driver CKDVR2 332. The delayed CLKIN1 and CLKIN1-bar signals after delays 360, 365 are also fed back to the previous clock driver CKDVR1 331 as CLKCAP1 and CLKCAP1-bar (as will be further described in association with FIG. 7). Similarly, the progressively delayed CLKIN's for each clock driver will be fed back to the previous clock driver as CLKCAP's. As shown in FIG. 5, CLKIN1 300 and its non-overlapping complement are progressively delayed by the staggered delays 320, 325, 360, 365, 370, 375 such that the inputs to clock drivers CKDVR 332, ..., 335 are progressively delayed and non-overlapping from the previous clock driver. Thus each charge pump pair 341-345 in stage 31 has different phases of the same clock CLKIN1 300 and its complement as input switching clocks. These delayed clocks generated from one CLKIN are uncorrelated from the delayed clocks from other CLKIN's.

These uncorrelated clocks help to further spread out power supply noise and further smooth out the output waveforms DBOUT 350 and EBOUT 351, as well as help source a more constant current from the charge pump as a whole.

In a similar fashion, clocks CLKIN2-CLKIN5 301-305 are applied to stages 32-35 through non-overlapping circuits staggered delay buffers such that the charge pump pairs in each stage are driven by different and non-overlapping phases of the same clock. As illustrated in FIG. 5, five input CLKIN's can provide 25 pairs of switching clocks, SWCLK's and SWCLK's-bar, for 25 charge pump pairs. Furthermore, the five input clocks CLKIN's can be readily provided by a 5-stage ring oscillator (not shown) with a 72-degree phase delay between each CLKIN. It would be apparent to those skilled in the art that other delay means can be utilized to differentiate the phases of input clocks CLKIN's to achieve noise distribution and output ripple reduction.

The multiple charge pump pairs structure 30 driven from clock phases that are staggered in phase also exhibits a clear advantage in basic capacitor defect tolerance over its single string or dual serial brethren, which should be appreciated by those skilled in the art. As long as the detrimental effects of a capacitor short can be kept isolated to the series string where it occurs, the multiple charge pump pairs 30 as a whole will continue to function and can continue to deliver a high portion of its current delivery capability that is directly related to the number of parallel independent series charge pumps.

Each series is considered independent because the operation of the charge pump "pairs," i.e. those with non-overlapping inverting and non-inverting clocks, are tightly coupled in operational behavior and also in the effects of a capacitor shorting defect in one of the series charge pumps.

Figure 6:
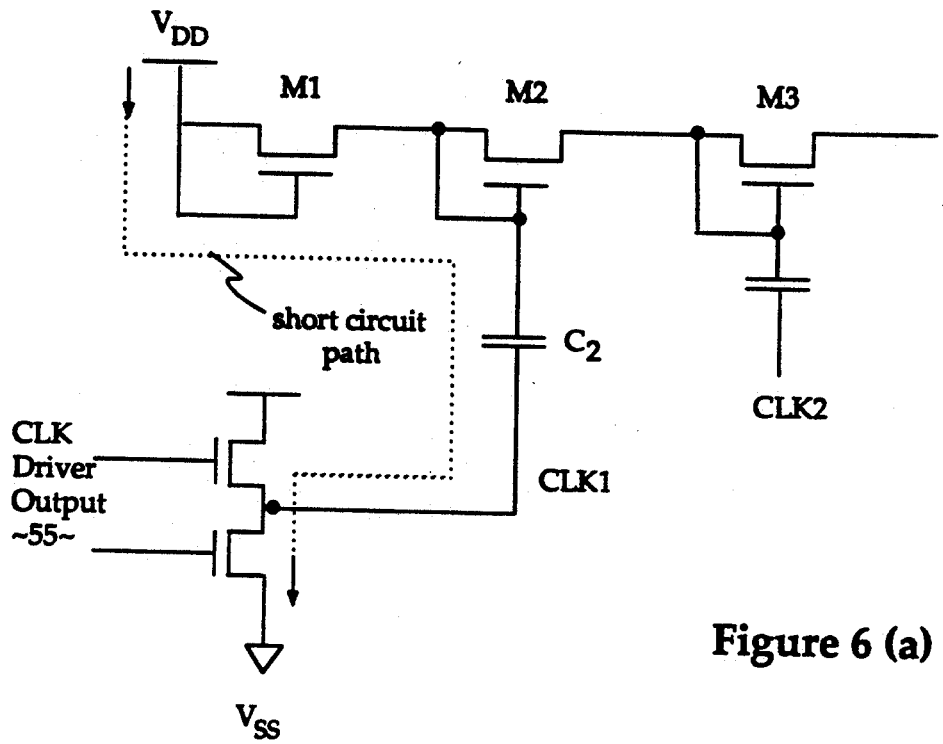
FIGS. 6(a), 6(b) and 6(c) illustrate a detailed charge pump pair in a third embodiment with additional features to allow capacitor fault-tolerant operation.
Figure 6:
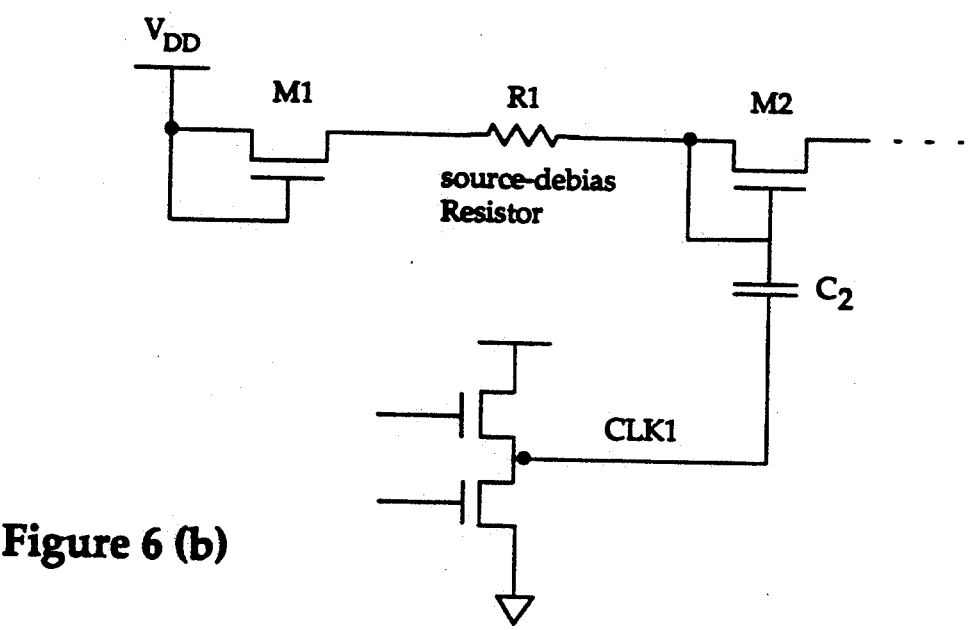
Figure 6:
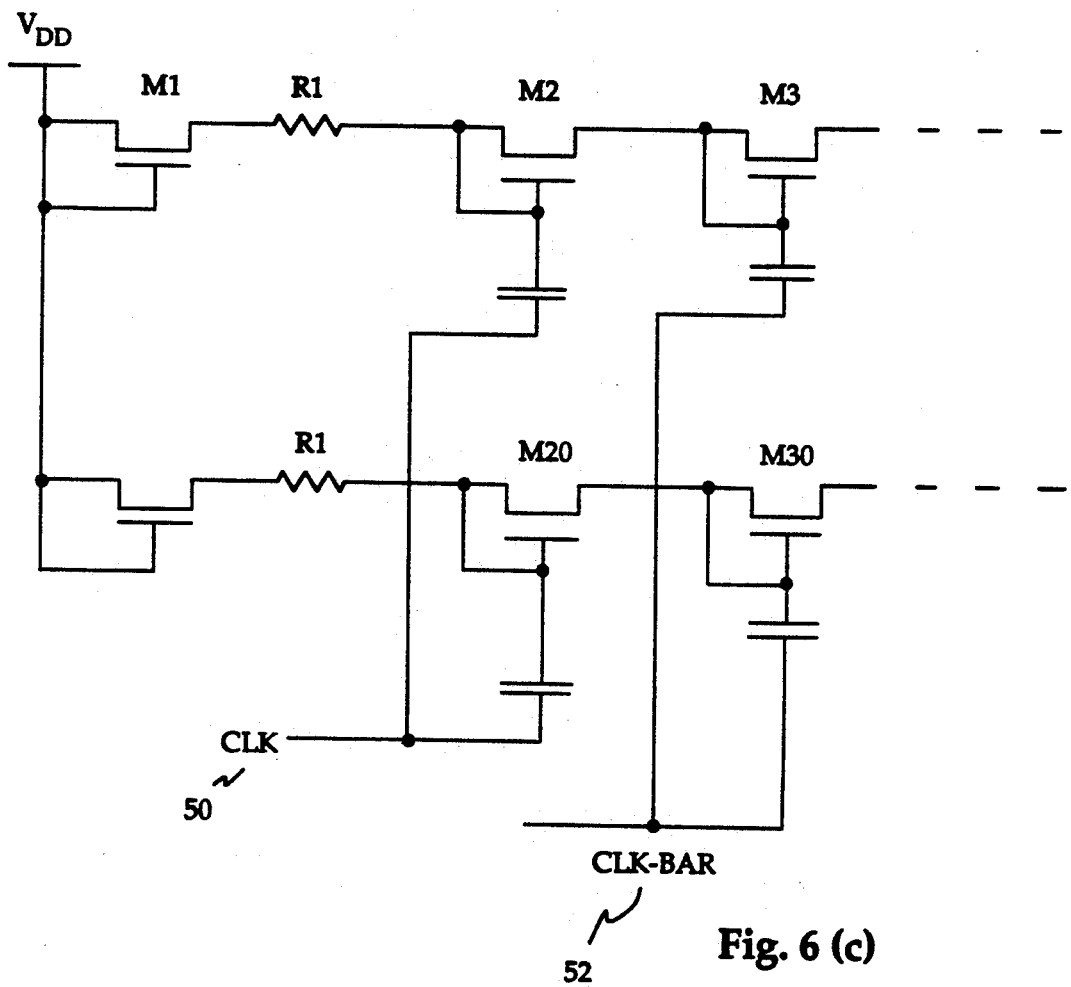

Reference is now made to FIG. 6(a). The following applies to a Poly$_2$-Poly$_1$ capacitor or a Poly-to-diffusion plate capacitor. In general, a capacitor C2 short will tend to couple the gate-source connection of a diode-connected MOS transistor M1 directly to the output of CLK Driver Output 55. The charge pump with the short will be disabled in operation, but will not affect the capacity of the other charge pumps generated by different sets of clock pairs due to the rectifying nature of the diode connected MOS device connected to the defective capacitor. Therefore, voltage beyond or at the output of that affected stage can rise above the input of the defective stage without interaction to the rest of the charge pump operation.

The series charge pump in the affected complementary clock pair, however, is not independent of the defective charge pump series. This is true because the shorted capacitor will affect the operation of the clock driver that is shorted through the capacitor to the pump diode and hence will reduce the efficiency of charge pumping of the good companion charge pump driven by the clock pair. The operation of the companion series will likely not be terminated, but reduced in capacity similarly.

A second case applies to another way of forming pump capacitors, i.e. using active NMOS gates as capacitor elements. In that case, in addition to its string, the clock drivers will also be isolated from latch-up by the nature of the NMOS capacitors.

In case of a short, or "pinhole" through the MOS gate, the positive charge from the affected charge pump segment win be delivered to the p-minus substrate as hole current and will be dissipated by the substrate. The n-plus source and drain diffusions of the MOS capacitors will be only slightly biased forward by the local substrate as it dissipates the pumped current. Hence the clock driver driving the shorted capacitor will be only minimally affected by the defect. As such, it will be quite satisfactory to drive the capacitors with a CMOS output stage, whereas in the case of Poly$_2$-Poly$_1$ or Poly-diffusion plate capacitors, junction isolation from the shorted capacitor is not inherent and hence the clock drivers must be made to be latch-up proof.

FIG. 6(b) and 6(c) demonstrate a third embodiment as a solution to the special problem of a capacitor short in the first pumped stage of a charge pump with Poly$_2$-Poly$_1$ or Poly-diffusion plate capacitors.

Referring back to FIG. 6(a), if the first pumped capacitor C2 pumping M2 is shorted, there will be a direct short circuit from $V_{DD}$ to the CLK driver output 55 formed through the two diode connected MOS drivers M1 and M2, the shorted capacitor C2 and through to the CLK1 signal. The driver of CLK1 will pull towards Vss with about a 50% duty cycle. This defect is devastating in that a $V_{DD}$-to-Vss short will occur with a 50% duty cycle with a current magnitude as high as tens of milliamps for a section of a large charge pump capable of EPROM programming operation.

FIG. 6(b) shows a resistor R1 added for systematic improvement of this $V_{DD}$-to-Vss short circuit condition. This circuit works as follows: charge pump stages are sized to generate 100 to 200 μA of pumped current. Hence resistor R1 can be sized for a minimal voltage drop (~200 mV) across the charge pump, yet can also significantly de-bias the source of M1 so that the short circuit current due to defects of the first pump capacitor C2 can be limited to the 1 to 2 mA range. To further the effect, the charge pump segment can be divided into several parallel pumps, i.e. M2 with M20, M3 with M30, with the same CLK drivers 50, 52 as shown in FIG.

6(c). (In FLASH design, each segment has 2 parallel charge pumps per segment).

Figure 7:
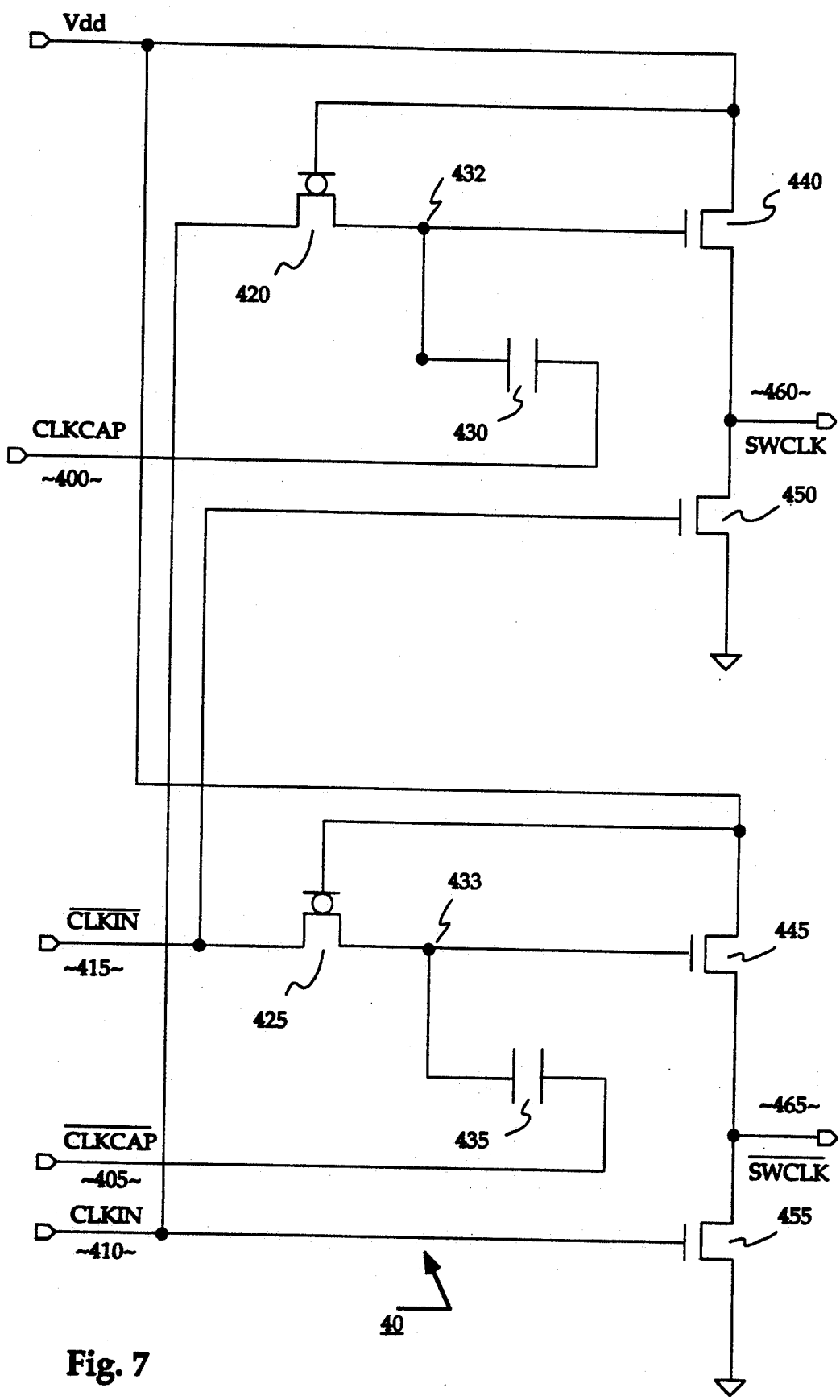
FIG. 7 illustrates a clock driver used in the multiple-staged charge pump network for generating SWCLK and SWCLK-bar clocks for each serial pump.

FIG. 7 illustrates a clock driver 40 used in the multiple-staged charge pump network 30 for generating SWCLK and SWCLK-bar clocks for each serial pump. CLKIN 410 is applied to the gate of transistor 455 and to the drain of native threshold n-channel transistor 420. CLKCAP 400 and CLKCAP-bar 405, which are delayed versions of CLKIN 410 and CLKIN-bar 415, respectively, as described in connection with FIG. 5, are applied to capacitors 430 and 435, respectively. CLKIN-bar 415 is applied to the drain of native threshold n-channel transistor 425 and the gate of transistor 450. The gate of transistor 440 is coupled to the source of the native threshold n-channel transistor 420 and also to capacitor 430. The source of transistor 440 is coupled to the drain of transistor 450 to form node SWCLK 460. The gate of transistor 445 is coupled to the source of the native threshold n-channel transistor 425 and also to capacitor 435. The source of transistor 445 is coupled to the drain of transistor 455 to form node 465 for signal SWCLK-bar.

As shown in FIG. 7, the clock driver 40 uses all n-channel devices for the reason that any shorting defects of capacitors might cause a p-channel device to latch up due to high return current at voltages elevated above Vdd. These all n-channel clock drivers are necessary for Poly2-Poly1 capacitors or Poly-diffusion plate capacitors in order to avoid an over-voltage condition on the pull-up device in the clock driver. If a PMOS pull-up were used, latch-up would likely be induced by the return current through the defective capacitor at voltage above Vdd. Capacitors 430, 435 function as bootstrapping capacitors for nodes 432, 433. When CLKIN 410 turns high, node 432 is precharged to a load of nearly Vdd, i.e. Vdd—VThresh. When CLKCAP 400 turns high a time delay after CLKIN 410, node 432 is booted above the Vdd potential to help transistor 440 pull its source all the way up to Vdd at the output node SWCLK 460.

Furthermore, using already described understanding of charge pumps it can be understood by those skilled in the art to develop a charge pump with the capability of satisfying two or more loadline characteristics. This can be accomplished by first tapping the output voltage from the middle points of a charge pump for lower Voc, lower $R_{equiv}$ than that of the last stage and second, tuning Cn for different $R_{equiv}$ for the two or more loadlines.

Figure 8:
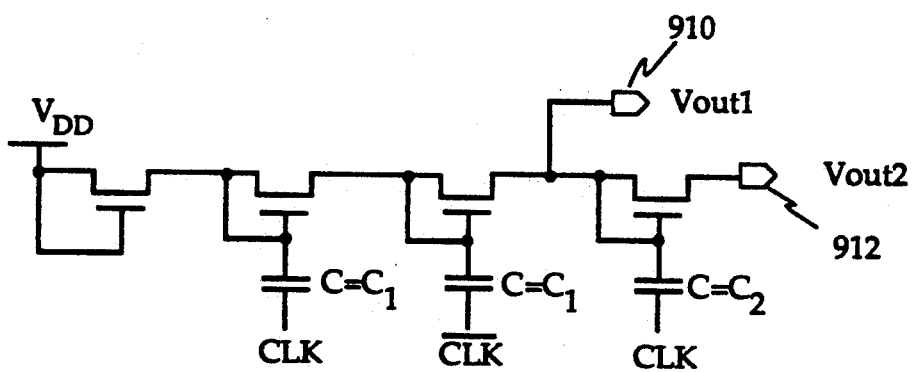
FIG. 8 illustrates a charge pump with three stages.

For example, charge pump with 3 pumped stages, as shown in FIG. 8, loadline #1 is taken from tapping after second pumped stage Vout1 910 and loadline #2 is taken from the end stage of the charge pump (third pumped stage Vout2 912).

For loadline #1, $Voc1 \approx 3(V_{DD} - V_T)$ $$Req1 \approx \frac{2}{fC_1(CCR)}, \text{ where}$$

$$CCR = \text{Capacitive Coupling Ratio} = Cn\left(\frac{1}{1 + \frac{Cparasitic}{Cn}}\right)$$

For loadline #2, $Voc2 \approx 4(V_{DD} - V_T)$ $$Req2 \approx \frac{2}{fC_1(CCR)} +$$

$$\frac{1}{fC_2(CCR)} \approx \frac{1}{f(CCR)}\left(\frac{2}{C_1} + \frac{1}{C_2}\right)$$

Figure 9:
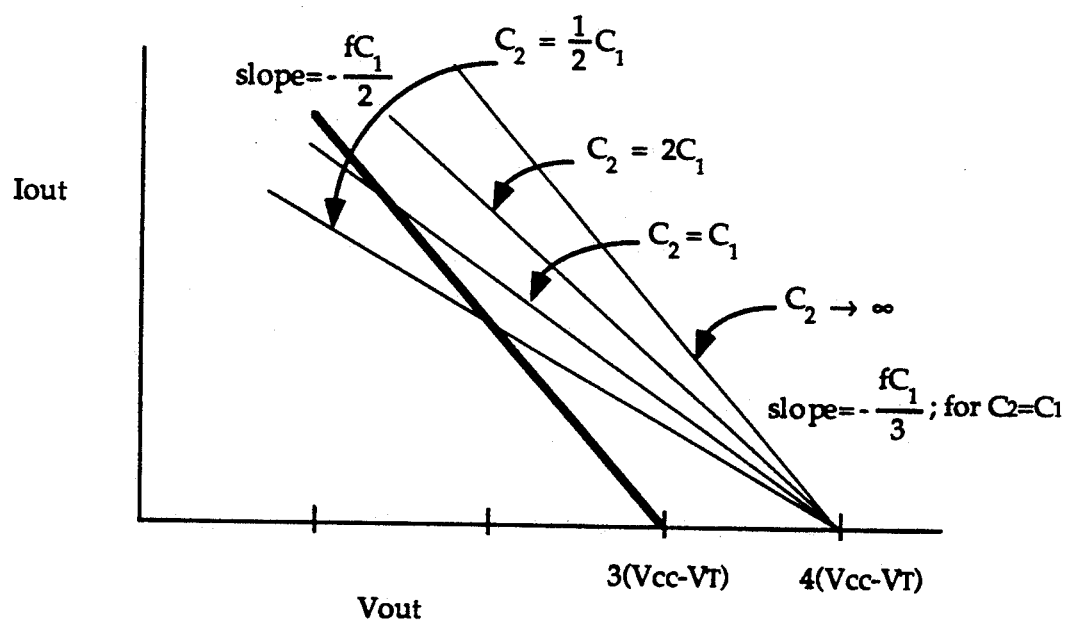
FIG. 9 illustrates loadline characteristics for different values of capacitors.

FIG. 9 shows loadline characteristics for various values of $C_2$. The following relations govern:

Normal: $Req1 = \frac{2}{fC_{1eq}}$, $Req2 = Req1 + \frac{1}{fC_{2eq}}$;

for $C_1 = C_2$; $Req2 = \frac{3}{fC_{1eq}}$;

Limits: $Req2 = Req1$ for $C_2 >> C_1$;

$Req2 = \infty$ for $C_2 << C_1$;

for $C_2 = C_1$, $Req2 = \frac{3}{2} Req1$.

As will be appreciated by those skilled in the art, it is not practical to make $C_2 > C_1$, because this will cause large voltage drops across the earlier pumped stages and limit the range of operation on the linear I–V curve.

For example, in the case $C_2 >> C_1$, $Req_2 = Req_1$, this case could also be satisfied by making $C_2 = C_1$ and increasing $C_1$ by 50% over the earlier example, hence being much more efficient in area on silicon.

The case of interest is for $C_2 < C_1$ in that if the charge pump needs to satisfy a condition where Vout1 910 needs to supply a large amount of current while Vout needs to be elevated in voltage, but supply a current less than can be generated by making $C_2 = C_1$. In this case, silicon area can be saved by optimizing the capacitance values of the pumped stages.

Following are conditions that should apply to the operation of such a charge pump with outputs tapped off the center of the pump:

1) concurrent operation of both loadlines is indeterminate so that those skilled in the art will appreciate that only one output at a time should be used.
2) a short circuit in the capacitor after the output taps (for instance the third pumped capacitor after Vout1 910 in the example shown in FIG. 8) will cause Vout1 910 to short to CLK unless measures are taken to avoid this situation.

Figure 10:
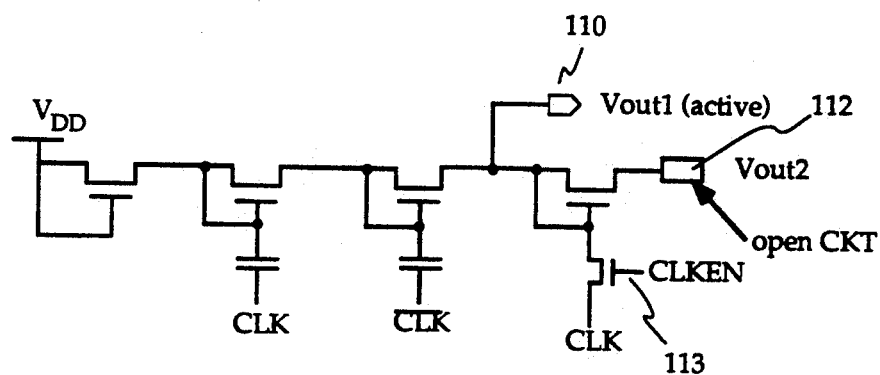
FIG. 10 illustrates a fourth embodiment of the present invention.

FIG. 10 illustrates a charge pump which prevents CLK from being shorted to Vout1 110 by a third capacitor short circuit. Either of Vout1 110 or Vout2 112 can be used to accommodate the specific loadline behavior required by the system. For multi-parallel charge pumps it should be readily adaptable by those skilled in the art in view of the above described application.

I claim:

1. A charge pump network for converting a first voltage to a second voltage with reduced noise distribution and reduced output ripples, said charge pump network comprising:
   at least one input clock,
   delay means coupled to said input clock, said delay means generating a plurality of non-overlapping staggered delayed clocks from said input clock with a predetermined delay between each of said staggered delay clocks such that a first staggered delayed clock is delayed to form a second staggered delayed clock;
   clock divider means coupled to receive said plurality of non-overlapping staggered delayed clocks, said clock driver means generating a switching clock for each of said plurality of staggered delayed clocks, each of said switching clocks having a higher current capability than the corresponding staggered delayed clock from said plurality of staggered delay clocks;

a multiple staged charge pump coupled to receive said plurality of switching clocks from said clock driver means, each stage of said multiple staged charge pump having multiple series connected in parallel, each series having a plurality of diode-connected n-channel MOSFETs, the first n-channel MOSFET in each series being coupled to said first voltage, each of the remainder of said n-channel MOSFETs in each series being coupled to a capacitor at its gate, each series having its adjoining n-channel MOSFETs driven by different switching clocks from said clock driver means such that no two adjoining n-channel MOSFETs are driven at the same time;

second voltage means coupled to the last n-channel MOSFET in each series of said multiple-series charge pumps for generating said second voltage from combining all of said series after said first voltage is switch-regulated through said multiple staged charge pump; and inverter means coupled to said input clock for generating a complementary input clock from said input clock, said complementary input clock to be driven by said clock driver means to generate complementary phases of switching clocks from said non-overlapping staggered delayed clocks.

2. A charge pump network according to claim 1, wherein said at least one input clock comprises a plurality of input clocks.

3. A charge pump network according to claim 1, wherein said clock driver means comprises a plurality of driver circuits for converting a first clock into a second clock having higher drive capability, said first clock being from said plurality of non-overlapping staggered delayed clocks, each of said driver circuits comprising:

a native threshold n-channel MOSFET with its gate coupled to a power supply, its drain coupled to said first clock;

a first n-channel MOSFET with its gate coupled to the source of said native threshold n-channel MOSFET, its drain coupled to said power supply;

a capacitor coupled to the gate of said first n-channel MOSFET and to a delayed version of said first clock; and a second n-channel MOSFET with its gate coupled to receive a complement of said first clock, its drain coupled to the source of said first n-channel MOSFET to form an output node such that a second clock at said output node is pulled to said power supply by said delayed version of said first clock pumping said capacitor after said first clock turns high.

4. A charge pump network according to claim 3, further comprising a plurality of complementary driver circuits for generating a complement of said second clock, each of said complementary driver circuits comprising:

a native threshold n-channel MOSFET with its gate coupled to said power supply, its drain coupled to the complement of said first clock;

a first n-channel MOSFET with its gate coupled to the source of said native threshold n-channel MOSFET, its drain coupled to said power supply;

a capacitor coupled to the gate of said first n-channel MOSFET and to a delayed version of the complement of said first clock; and a second n-channel MOSFET with its gate coupled to receive said first clock, its drain coupled to the source of said first n-channel MOSFET to form an output node such that the complement of said second clock at said output node is pulled to said power supply by said delayed version of the complement of said first clock pumping said capacitor after the complement of said first clock turns high.

5. A charge pump network according to claim 2, wherein said delay means comprises a plurality of CMOS inverters for converting each said input clock into said plurality of staggered delayed clocks by successively delaying said input clock with a predetermined delay to generate an output to be applied to said clock driver means.

6. A multiple-series charge pump comprising a plurality of series charge pumps, said multiple-series charge pump for converting a first voltage to a second voltage with reduced noise distribution and capacitor short tolerance, each of said series charge pumps comprising:

a plurality of diode-connected NMOSFETs connected in series, the first NMOSFET in the series being coupled to said first voltage and the last NMOSFET in said series being coupled to said second voltage, each of the remaining NMOSFETs in said series being coupled at its gate to a capacitor, wherein each of said capacitors can be sized to generate a different loadline characteristic for said multiple series charge pump, said series having its adjoining NMOSFETs driven by different such that no two adjoining NMOSFETs are driven at the same time;

a series resistor coupled between said first NMOSFET and its adjoining NMOSFET to limit return current to a predetermined level and to provide a voltage drop from said first voltage across said series resister;

clocking means coupled to said multiple series charge pump for providing said different clocks, said clocking means having all NMOSFET buffers to guard against return current latch-up; and a clock pass gate coupled to the last NMOSFET of last NMOSFET when tapping off from the second to last NMOSFET of said series to form an output for a third voltage, said third voltage being lower than said second voltage, wherein said third voltage generates higher current than said second voltage.

7. A multiple series charge pump according to claim 6, wherein said multiple series charge pump is operated in pairs such that said clocking means generates balanced clock loadings with non-overlapping phases and such that any capacitor short is limited to a single clock pair.

8. A charge pump network for converting a first voltage to a second voltage with reduced noise distribution and reduced output ripples, said charge pump network comprising:

an oscillator means for generating a plurality of input clocks, each of said plurality of input clocks staggered in time with respect to each other;

delay means coupled to receive one input clock of said plurality of input clocks, said delay means for generating a plurality of non-overlapping staggered delayed clocks from said one input clock with a predetermined delay between each of said staggered delayed clocks such that a first staggered delayed clock is delayed to form a second staggered delayed clock;

clock driver means coupled to receive said plurality of non-overlapping staggered delayed clocks, said clock driver means for generating a switching clock for each of said plurality of staggered delayed clocks, each of said switching clocks having a higher current capability than the corresponding staggered delayed clock from said plurality of staggered delayed clocks;

a multiple staged charge pump coupled to receive said plurality of switching clocks from said clock driver means, each stage of said multiple staged charge pump having multiple series connected in parallel, each series having a plurality of diode-connected n-channel MOSFETs, the first n-channel MOSFET in each series being coupled to said first voltage, each of the remainder of said n-channel MOSFETs in each series being coupled to a capacitor at its gate, each series of said each stage having its adjoining n-channel MOSFETs driven by different switching clocks from said clock driver means such that no two adjoining n-channel MOSFETs are driven at the same time; and second voltage means coupled to the last n-channel MOSFET in each series of said multiple-series charge pump for generating said second voltage from combining all of said series after said first voltage is switch-regulated through said multiple staged charge pump.

9. A charge pump network as described in claim 8 and further comprising inverter means coupled to said one input clock for generating a complementary input clock from said one input clock, said complementary input clock to be driven by said clock driver means to generate complementary phases of switching clocks from said non-overlapping staggered delayed clocks.

10. A charge pump network as described in claim 9 wherein said oscillator means is a ring oscillator means.

11. A charge pump network as described in claim 9 wherein said clock driver means comprises a plurality of driver circuits for converting a first clock into a second clock having higher drive capability, said first clock being from said plurality of non-overlapping staggered delayed clocks, each of said driver circuits comprising:

a native threshold n-channel MOSFET with its gate coupled to a power supply, its drain coupled to said first clock;

a first n-channel MOSFET with its gate coupled to the source of said native threshold n-channel MOSFET, its drain coupled to said power supply;

a capacitor coupled to the gate of said first n-channel MOSFET and to a delayed version of said first clock; and a second n-channel MOSFET with its gate coupled to receive a complement of said first clock, its drain coupled to the source of said first n-channel MOSFET to form an output node such that a second clock at said output node is pulled to said power supply by said delayed version of said first clock pumping said capacitor after said first clock turns high.

12. A charge pump network as described in claim 9 and further comprising a plurality of complementary driver circuits for generating a complement of said second clock, each of said complementary driver circuits comprising:

a native threshold n-channel MOSFET with its gate coupled to said power supply, its drain coupled to the complement of said first clock;

a first n-channel MOSFET with its gate coupled to the source of said native threshold n-channel MOSFET, its drain coupled to said power supply;

a capacitor coupled to the gate of said first n-channel MOSFET and to a delayed version of the complement of said first clock; and a second n-channel MOSFET with its gate coupled to receive said first clock, its drain coupled to the source of said first n-channel MOSFET to form an output node such that the complement of said second clock at said output node is pulled to said power supply by said delayed version of the complement of said first clock pumping said capacitor after the complement of said first clock turns high.

13. A charge pump network as described in claim 9 wherein said delay means comprises a plurality of CMOS inverters for converting each input clock of said plurality of input clocks into said plurality of staggered delayed clocks by successively delaying said each input clock with a predetermined delay to generate an output to be applied to said clock driver means.

* * * * *